United States Patent [19]

Watanabe et al.

[11] 4,242,783
[45] Jan. 6, 1981

[54] CALENDER ROLL FOR USE IN SUPER CALENDER FOR MAGNETIC TAPES

[75] Inventors: Kenji Watanabe; Goro Akashi, both of Odawara, Japan

[73] Assignee: Fuji Photo Film Co., Ltd., Minami-ashigara, Japan

[21] Appl. No.: 923,751

[22] Filed: Jul. 11, 1978

[30] Foreign Application Priority Data

Jul. 11, 1977 [JP] Japan .................................. 52-82054

[51] Int. Cl.³ ........................ B21B 27/02; B21B 31/08
[52] U.S. Cl. .................................................... 29/132
[58] Field of Search .......................... 29/130, 132, 131

[56] References Cited

U.S. PATENT DOCUMENTS

| | | | |
|---|---|---|---|
| 2,178,421 | 10/1939 | Freelander | 29/132 X |
| 3,593,398 | 7/1971 | Hess | 29/132 |
| 3,662,446 | 5/1972 | Walls | 29/132 X |
| 3,673,025 | 6/1972 | Fukuyama et al. | 29/132 X |
| 3,707,752 | 1/1973 | Brafford | 29/132 |
| 3,753,276 | 8/1973 | Reisch | 29/132 X |
| 3,971,115 | 7/1976 | Schneider et al. | 29/132 X |

FOREIGN PATENT DOCUMENTS 986734 3/1965 United Kingdom ...................... 29/132

*Primary Examiner*—James Kee Chi
*Attorney, Agent, or Firm*—Sughrue, Rothwell, Mion, Zinn and Macpeak

[57] ABSTRACT

An elastic calender roll for use in a super calender for magnetic tape is disclosed, which comprises a roll core and a roll portion which is composed of a fibrous material molded with a plastic material. The fibrous material has a better heat resistivity than that of the plastic material and the surface portion of the calender roll is of the plastic material and has a Shore hardness of at least 80 degrees.

8 Claims, 1 Drawing Figure

CALENDER ROLL FOR USE IN SUPER CALENDER FOR MAGNETIC TAPES

BACKGROUND OF THE INVENTION

The present invention relates to a calender roll for use in a super calender for magnetic tapes and, particularly, to a elastic calender roll of a super calender which is to be used in calendering the magnetic surface of a magnetic recording medium such as video tape, memory tape, audio tape, etc.

There are known four kinds of calendering methods for magnetic tape. According to a first method, the calendering effect is obtained by suitably selecting a dispersion agent of a magnetic painting liquid at the preparation stage of the magnetic painting liquid, and a dispersion method thereof onto a tape base. It is known in this method, however, that the electromagnetic conversion characteristics of the final tape, particularly the sensitivity and S/N ratio thereof, are insufficient. In the second method, the calendering is performed by rubbing the surfaces of the magnetic layers of tapes with each other at a high relative velocity. The quality of the tape provided by the second method is relatively low due to a considerable removal of the magnetic particles from the tape during the rubbing. According to the third method, the magnetic layer surface of the tape is polished by fur or plastic or metal brushes. The tape provided by the third method has, however, a relatively rough surface which is not suitable to use for high density recording.

The fourth method is to use a super calender using a pressure roll. The pressure roll, i.e. an elastic roll is usually made by raw cotton, absorbent cotton, pulp, refined cotton or wool. The principle of the super calender and problems inherent to the elastic roll are disclosed in Japanese Patent Application Laid-Open No. 51-103404 (U.S. Ser. No. 657,800 filed on Feb. 13, 1976, now U.S. Pat. No. 4,128,673). As described in the Laid-Open No. 51-103404, the tape calendered by the roll made of cottons, woolen paper etc. is not suitable to use for present video tapes because the roll can not provide a sufficiently smooth surface due to the roll's fibrous surface pattern which is stamped on the tape surface as a result of the calendering.

Japanese Patent Application Laid-Open No. 51-103404 discloses a roll made of polyamide resin. This roll can provide a very smooth or flat magnetic tape surface. However, since the softening point of polyamide resin is relatively low, it is impossible to greatly increase the calendering pressure i.e., nipping pressure, and/or the rotation speed of the roll without deformation of the roll. This causes a low producibility of tape. That is, polyamide resin, such as nylon, has a large thermal expansion coefficient and low thermal conductivity. Therefore, a calender roll made of such a material is heated by self-heating due to the pressurized rotation thereof and expands, thereby producing a calendered tape of low quality.

A roll made of rubber which can also provide a smooth surface is difficult to manufacture due to the difficulty of balancing the surface smoothness and hardness thereof.

SUMMARY OF THE INVENTION

This invention is intended to eliminate the disadvantages of the conventional roll for a super calender.

An object of the present invention is to provide an elastic calender roll for a super calender adopted to be used for calendering a magnetic recording tape, which roll has a minimum expansion coefficient and, hence, minimum deformation, and a high mechanical strength.

The calender roll according to the present invention has a good thermal conductivity and a high mechanical strength, so that the self-heating of the rotating roll due to the nipping pressure, and the deformation of the roll, are minimized.

The present roll is composed of a roll core, an inner roll portion made of fibrous material and an outer roll portion made of a plastic material, so that the fibrous material does not exist in the surface portion of the roll.

In more detail, the roll according to the present invention includes a surface layer of plastic material having a hardness equal to or larger than 80 degrees share and a linear expansion coefficient of at least about $8 \times 10^{-5}/°C$., preferably $8 \times 10^{-5}/°C$., an inner portion of fibrous material having a higher heat-resistivity than that of the plastic material, and a roll core. With this combination of the plastic material and the fibrous material, all of the requirements of durability, pressure-resistivity and surface smoothness of the roll are satisfied simultaneously.

Plastic material, when formed as a roll according to the present invention, should have a Shore hardness of at least 80 degrees when measured by the "D" scale of the Shore hardness meter.

BRIEF DESCRIPTION OF THE DRAWING

The single FIGURE shows a cross section of an embodiment of the elastic roll for super calender, according to the present invention.

DETAILED DESCRIPTION OF THE EMBODIMENTS

Figure 1:
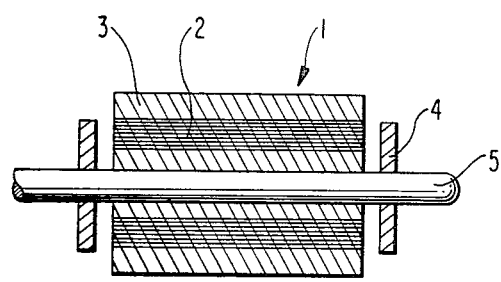

In FIG. 1, a fibrous cloth is wound around on a roll core 5 to form a cylindrical inner roll portion of layers 2 with a total thickness of 20 to 30 mm and the cylindrical layers 2 are impregnated and molded with nylon to form a resilient calender roll 1. The fiber material should not exist in the surface portion of the roll 1 so that the surface smoothness of the roll 1 is not degraded. In order to ensure the surface smoothness, it is advisable to form an outer layer 3 between the surface of the roll and the outer surface of the fiber layer with only plastic material, and the thickness of the outer layer 3 is preferably about 10 to 15 mm.

On the roll core 5, a pair of end plates 4 are provided to prevent axial shifts of the surface resin layer of the elastic roll and to radiate the heat due to the self-heating of the roll.

The plastic material using the elastic roll of the present invention is preferably polyamide resins having a shore hardness D of at least about 80 or greater, and a linear expansion coefficient of at least about $8 \times 10^{-5}/°C$., preferably $8 \times 10^{-5}/°C$. or greater.

The term "polyamide resin" as is used in the present invention refers to a condensation polymer having acid amide bonds (—CONH—) in the main chain thereof. In more detail, the acid amide bond (a) may be separated by a divalent group as illustrated by the formulae and typical examples below; (b) may have one additional —CO— group on the nitrogen atom of the amide bond (i.e., imide bond

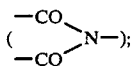

a polymer containing the same is sometimes referred to as a "polyimide resin" herein); and (c) may also be present with an imide bond (i.e., a polymer containing amide and imide bonds, which is sometimes referred to as a "polyamideimide resin" herein). Representative examples of methods for producing useful polyamide resins are shown below:

(1) Condensation of Diamines and Dicarboxylic Acids

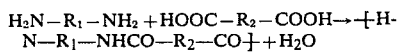

(2) Condensation of Amino Acids

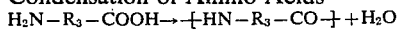

(3) Ring-Open Reaction of Lactams

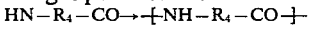

In reactions (1) to (3) above, $R_1$, $R_2$ and $R_4$ each represents either nothing, i.e., a direct bond between the moieties separated thereby, or a divalent group, having 1 to 20 carbon atoms; and $R_3$ represents a divalent group having 1 to 10 carbon atoms.

Preferred examples of $R_1$ are a divalent group free of substituents directly connected between the two nitrogen atoms; an alkylene or alkylene group having 1 to 20 carbon atoms, cyclohexanediyl, phenylene, tolylene, xylylene, naphthylene, biphenylene, etc.

Preferred examples of $R_2$ are a divalent group free of substituents directly connected between the two carbon atoms; an alkylene or alkylene group having 1 to 20 carbon atoms, cyclohexanediyl, phenylene, tolylene, xylylene, naphthylene, biphenylene, etc.

Preferred examples of $R_3$ are an alkylene group having 1 to 10 carbon atoms, a carboxyl-substituted alkylene group having 1 to 10 carbon atoms, a phenyl-substituted alkylene group having 1 to 10 carbon atoms, etc.

Preferred examples of $R_4$ are a divalent group free of substituents and directly connected between the nitrogen atom and the carbon atom and an alkylene group having 1 to 20 carbon atoms.

Dicarboxylic acids as employed in reaction (1) may be in the form of the anhydrides or esters thereof. Amino acids as employed in reaction (2) may also be in the form of the anhydrides thereof.

Specific examples of diamines employed in reaction (1) include hydrazine, methylene diamine, dimethylene diamine, trimethylene diamine, tetramethylene diamine, pentamethylene diamine, hexamethylene diamine, heptamethylene diamine, octamethylene diamine, nonamethylene diamine, decamethylene diamine, piperazine, diaminocyclohexane, di(aminomethyl)-cyclohexane, bis(4-aminocyclohexyl)methane, bis(4-amino-1,2-dimethylcyclohexyl)methane, o-phenylenediamine, m-phenylenediamine, p-phenylenediamine, 4,4'-diaminobiphenyl, tolylenediamine, xylylenediamine, naphthylenediamine, etc. Specific examples of dicarboxylic acids include oxalic acid, malonic acid, succinic acid, glutaric acid, adipic acid, pimelic acid, cork acid, azelaic acid, sebacic acid, nonanedicarboxylic acid, decanedicarboxylic acid, undecanedicarboxylic acid, dodecanedicarboxylic acid, hexadecanedicarboxylic acid, transinic acid, Japan acid, maleic acid, fumaric acid, citraconic acid, diglycolic acid, malic acid, citric acid, phthalic acid, isophthalic acid, terephthalic acid, maleic anhydride, phthalic anhydride, etc.

Specific examples of amino acids (aminocarboxylic acids) employed in reaction (2) include α-aminoacetic acid, L-α-amino-propionic acid, L-α-aminosovaleric acid, ε-aminocaproic acid, L-α-aminoisocaproic acid, L-α-amino-β-phenylpropionic acid, L-aminosuccinic acid (aspargic acid), L-α-aminoglutaric acid (glutamic acid), γ-aminobutyric acid, α-amino-n-adipic acid, 11-aminodecanoic acid, α-amino-DL-isoamylacetic acid, α-amino-n-butyric acid, α-amino-2-methylbutyric acid, α-aminocapric acid, α-aminocaproic acid, 1-aminocyclohexanecarboxylic acid, α-aminocyclohexylacetic acid, 1-amino-α-methylcyclohexanecarboxylic acid, aminomalonic acid ethyl ester, β-benzyl-L-aspartate, β-benzyl-DL-aspartate, γ-benzyl-DL-glutamate, etc.

Specific examples of lactams employed in reaction (3) include isocyanic acid, glycine anhydride, α-pyrrolidone, α-piperidone, γ-butyrolactam, ε-valerolactam, ε-caprolactam, α-methylcaprolactam, γ-methylcaprolactam, γ-methylcaprolactam, δ-methylcaprolactam, β,γ-dimethylcaprolactam, γ-ethylcaprolactam, γ-isopropylcaprolactam, ε-isopropylcaprolactam, γ-butylcaprolactam, ε-enantolactam, ω-enantolactam, η-caprylactam, ω-caprylcatam, ω-laurolactam, etc.

These polyamides are usually termed nylons. Specific examples of nylons are nylon-1 obtained by the polymerization of isocyanic acid, nylon-2 obtained by the polymerization of N-carboxyamino acid anhydride, nylon-3 obtained by the polymerization of β-aminopivalic acid, nylon-4 obtained by the ring-open polymerization of α-pyrrolidone, nylon-5 obtained by the ring-opening polymerization of α-piperiodone, nylon-6 obtained by the ring-opening polymerization of ε-caprolactam, nylon-7 obtained by the polymerization of ω-aminoenantoic acid, nylon-8 obtained by the ring-open polymerization of caprylactam, nylon-9 obtained by the polymerization of ω-aminononyl acid, nylon-10 obtained by the ring-open polymerization of caprylolactam, nylon-11 obtained from 11-aminoundecanoic acid, nylon-12 obtained by the ring-opening polymerization of ω-laurolactam, nylon-66 obtained by the condensation polymerization of hexamethylene diamine and adipic acid, nylon-610 obtained by the condensation polymerization of hexamethylene diamine and sebacic acid, etc. Copolymers of these nylons, for example, nylon-6/66/610 (copolymerization ratio: 10/40/50), can also be employed.

In addition, copolymers of these nylons with the other monomers can also be employed. Specific examples include graft copolymers with vinyl monomers such as 2-methyl-5-vinylpyridine, styrene, methyl methacrylate, sodium acrylate, vinyl acetate, vinylidene chloride, acrylonitrile, etc.; copolymers with ring-open polymerixable monomers such as ethylene oxide, propylene oxide, ethylene imine, cycloxabutane, ethylene sulfide, epichlorohydrin, maleic anhydride, phthalic anhydride, hexahydrophthalic anhydride, dichloromaleic anhydride, dodecyl succinic anhydride, etc.

These copolymers can be obtained by conventional methods, for example, graft polymerization, acylation, alkylation, etc.

Monomer casting nylons (MC nylons) which are obtained by the rapid ring-open polymerization of lactams in the presence of a catalyst and then molding the polymer can also be employed in the present invention.

Reference should be made to the Chemical Engineering News and Modern Plastics citations later given. MC nylons are generally prepared by casting nylon monomers, e.g., ε-caprolactam melted at 100° C. in the absence of water, to which a small amount of an alkali catalyst has been added, into a mold previously heated to a temperature between 100° C. and the melting point of the monomer, and subjecting the monomer to polymerization for a definite period of time.

The polyamide resins employed in the present invention can be in the form of crystals which are rendered dense, fine and uniform by adding thereto crystallizing agents. Examples of preferred crystallizing agents are phosphorus compounds such as $Pb_3(PO_4)_2$, $NaHPO_4$, $Na_7P_5O_{16}$, etc.; fine particles of ores such as corundum, rutile, kaolin, asbestoes, graphite, $MoS_2$, $WS_2$, $SiO_2$. Talc, etc.; powdered polymers such as polyethylene terephthalate, polyethylene naphthalate, etc.

The polyamide resins may also be reinforced with glass. FRTP (fiber glass reinforced thermoplastic) resins which are obtained by kneading glass fibers into polyamide resins, dispersing glass fibers into pellets of polyamide resins, filling with glass beads, etc., can also be employed.

Of these polyamide resins, MC nylons are particularly preferred. Abrasives (e.g., $MoS_2$, $WS_2$, etc.) can be incorporated into the MC nylons during polymerization, if desired.

The molecular weight of these polyamide resins is generally from about 10,000 to about 1,000,000, preferably about 50,000 to about 600,000. A preferred polymerization degree is about 150 to about 3,000. Both molecular weight and polymerization degree are not overly critical.

Examples of MC nylons which are commercially available are nylon-6 such as Amylan CM 1031 (trade name, Toray Industries, Ltd.), Ube Nylon EA 1030 (trade name, Ube Industries, Ltd.), Glyron A 1050 (trade name, Unitika, Ltd.), Plaskon 8211, 8229 trade name, Allied Chemical Corp.), Spencer Nylon 607 (trade name, Spencer Chemical Co., Ltd.), Foster Nylon BK40F and BK40T (trade names, Foster Grant Co., Ltd.), Ultramid BKR 1144/3 (trade name, BASF A.G.), Durethan BK50F and BK64F (trade names, Bayer A.G.), Maranyl F160 and F170 (trade names, ICI, Ltd.), etc.; nylon-66 such as Amylan CM 3021 (trade name, Toray Industries, Ltd.), Zytel 42 (trade name, E. I. du Pont de Nemours & Co.), Ultramid AKR 1183 (trade name, BASF A. G.), Maranyl A150M and A100E (trade names, ICI, Ltd.), Nylatron GS (trade name, Polymer Corp.), etc.; nylon-610 such as Amylan CM2006 (trade name, Toray Industries, Ltd.), Zytel 38 (trade name, E. I. du Pont de Nemours & Co.), Ultramid S4 and S4K (trade names, BASF A.G.), Maranyl B100 and B100C (trade names, ICI, Ltd.), etc.; FRTP nylon-6 such as Amylan CM1003G (trade name, Toray Industries, Ltd.), UBE Nylon IB1013G (trade name, Ube Industries, Ltd.), Glyron A1030GF (trade name, Unitika, Ltd.), Plaskon 8230 (trade name, Allied Chemical Corp.), Durethan BVK30H (trade name, Bayer A.G.), Ultramid B3G (trade name, BASE A.G.), etc.; FRTP nylon-66 such as Amylan CM3003G (trade name, Toray Industries, Ltd.), Zytel 7110-33 (trade name, E. I. du Pont de Nemours & Co.), Nylatron GS-51 (trade name, Polymer Corp.), Maranyl A190 (trade name, ICI, Ltd.), Ultramid A3G (trade name, BASF A.G.), etc.; FRTP nylon-12 such as Amylan XF 5000 and XF 5000F (trade names, Toray Industries, Ltd.), etc.; MC nylons such as MC 901, MC 904 and Nyratron GSM (MC 801) (trade names, Polymer Corp., and Mitsubishi Plastic Industries, Ltd.), Monomaron 21100, 21115, 21200, 21215, 21300 and 21315 (trade names, Starlight Industry Co., Ltd.), etc. MC nylons are described in detail in *Chemical Engineering News*, 39 (33), 58 (1961) and *Modern Plastics*, 45 (8), 173 (1968); all of the MC nylons described therein may be used with success in the present invention.

Useful polyamides are also described in detail in Osamu Fukumoto, Plastic Zairyo Koza (Plastic Materials Series) (16), *Polyamide Jushi (Polyamide Resin)*, published July 25, 1970, Nikkan Kogyo Shinbun (Industrial Daily News, Ltd.), Tokyo; Murahashi, Imoto, and Tani, *Gosei Kobunshi V (Synthetic High Molecular Weight Substance V)*, pages 11–186, published June 15, 1971, Asakura Shoten, Tokyo; and in U.S. Pat. Nos. 2,130,497, 2,130,523, 2,149,273, 2,158,064, 2,223,493, 2,249,627, 2,534,347, 2,540,352, 2,715,620, 2,756,221, 2,939,862, 2,994,693, 3,012,994, 3,133,956, 3,188,228, 3,193,475, 3,193,483, 3,197,443, 3,226,362, 3,242,134, 3,247,167, 3,299,099, 3,328,352 and 3,354,123, etc.

Polyimide resins and polyamideimide resins which are synthesized in a manner similar to the polyamide resins as described above can also be used.

The polyimide resins are obtained by a self-condensation polymerization of acid anhydrides or esters thereof (4-aminophthalic anhydride, dimethyl-4-diaminophthalate, etc.), by a condensation polymerization of acid anhydrides with diamines; or by the reaction of acid anhydrides with diamines in an organic solvent with subsequent intramolecular dehydrative cyclization of the resulting soluble polyamide acids.

The polyamideimide resins are obtained by the reaction of low molecular weight polyamides having amino groups at the terminals thereof with acid anhdrides; by the reaction of low molecular weight polyamide acids having amino groups at the terminals thereof and dibasic chlorides; by the reaction of treimellitic acid derivatives with diamines, etc.

Specific examples of acid anhydrides or esters thereof include pyromellitic anhydride, pyromellitic acid-1,4-dimethyl ester, pyromellitic acid tetramethyl ester, pyromellitic acid ethyl ester, 2,3,6,7-naphthalene tetracarboxylic dianhydrid 3,3',4,4'-diphenyl tetracarboxylic dianhydride, 1,2,5,6-naphthalene tetracarboxylic dianhydride, 2,2',3,3'-biphenyl tetracarboxylic dianhydride, 2,2',6,6'-biphenyl tetracarboxylic dianhydride, etc. Specific examples of diamines are those aromatic diamines as described hereinbefore.

Specific examples of solvents which are used in the preparation of polyamide resins include dimethylformamide, dimethylacetamide, dimethylmethoxyacetamide, n-methylcaprolactam, dimethylsulfone, tetramethylene sulfone, N-acetyl-2-pyrrolidone, etc.

Details on useful polyimide resin are described in M. T. Bogert et al., *Journal of American Chemical Society*, 30, page 1140 (1908), and in U.S. Pat. Nos. 2,710,853, 2,867,609, 2,880,230, 3,073,785, 3,179,614, 3,179,630, 3,179,633, 3,179,634, etc.

Details on useful polyimideamine resins are also described in G. M. Bower et at., *Journal of Polymer Science*, A-1, page 3135 (1903), and in U.S. Pat. No. 2,421,024, British Pat. No. 570,858, French Pat. No. 386,617, Belgian Pat. No. 650,979, etc.

The surface hardness of the elastic rolls in accordance with the present invention is at least about 80 in Shore hardness D (JIS K-6301), preferably from about 80 to about 100, more preferably 80 to 95. The compressive strength (ASTM, D-695) of the elastic rolls is above about 600 kg/cm$^2$, preferably above 700 kg/cm$^2$.

The linear expansion coefficient is at least about $8\times 10^{-5}$/°C., preferably about $8\times 10^{-5}$ to about $8\times 10^{-4}$/°C. It has been found that at these conditions good super calendaring effects are obtained.

When the Shore hardness is less than about 80 and the compressive strength is less than about 600 kg/cm$^2$, good surface properties are not achieved. When the Shore hardness exceeds about 100, the roll tends to be brittle and loses its elasticity. If such a roll is used for super calendering, it cracks and thus cannot be used.

Further, when the linear expansion coefficient is less than about $8\times 10^{-5}$/°C., a change in shape which prohibits expansion of the elastic roll in the direction of the axis thereof does not occur; on the other hand, when the linear expansion coefficient exceeds about $8\times 10^{-4}$/°C., the elastic roll is overly soft and, as a result, good super calendering effects are not obtained. The requirement of this specific linear expansion coefficient range must be met when one wishes to operate the super calendering roll assembly continuously.

The polyamide, polyimide, polyamideimide, or mixtures thereof may contain a small amount of water to further improve the properties of the elastic roll. When water is present in the elastic roll, electric charging due to friction is decreased, which serves to smooth the super calendering operation. The preferred range of the water content is up to about 10% by weight based on the resin weight. When MC nylons are used for the elastic roll, the water content can be up to about 7% by weight. When the water content is less than about 0.5% by weight, no substantial difference in friction charge-preventing effect is observed. A preferred water content is about 0.5 to about 2% by weight. The water can be added during the molding of the resin(s) into the elastic roll.

When an antistatic agent, e.g., carbon black, molybdenum disulfide, surface active agents, etc., are present in the elastic roll, however, the water content as described above is not limitative. It has been confirmed that it is preferred to use carbon black or molybdenum disulfide in an amount of about 3 wt% or more, and surface active agents in an amount of about 1 wt% or more based on the resin weight.

In addition, with the elastic rolls made of the polyamide, polyimide or polyamideimide (hereafter generally referred to a polyamide resin unless otherwise indicated) resins, if there are joints, wrinkles, etc., on the surface thereof, these tend to cause uneven pressure; it has been found that it is preferred to use elastic rolls prepared by a casting method as described in the earlier provided *Chemical Engineering News* and *Modern Plastics* citations in order to solve such problems, whereby the elastic rolls exhibit excellent compressive strength. It has also found that, in particular, good effects are obtained using these polyamide resins; MC nylons selected from nylon-6, nylon-66, and nylon-610.

As materials for the metal roll axis and endplates which are used in the present invention, metals are employed which are used in conventional super calendering rolls. The material selected for the metal roll axis is not overly important, and the present invention is not limited to any specific materials of construction. One skilled in the art will easily be able to appreciate the properties which useful metals must illustrate. For instance, typical examples of such metals are cast iron (carbon content: 2 to 4%), carbon steel, 5–7% Ni-cast iron, 14–17% Si-cast iron, stainless steel, cast stainless steel, heat resistant steel, heat resistant cast steel, 13% Cr-ferrite steel, 14–25% Ni-austenitic cast steel, 18 Cr-8 Ni-austenitic steel, duralumin, etc.; in which all percents are by weight. These materials may be subjected to hard chromium plating, if desired or necessary, in a conventional manner.

The pressure between the metal roll and elastic roll upon super calendering is generally about 250 to about 1,000 kg/cm$^2$; the treatment temperature is generally about 30° to about 200° C., preferably 40° to 150° C.

When the pressure between the rolls is less than about 250 kg/cm$^2$, no substantial super calendering effect is exhibited. When the pressure is greater than about 1,000 kg/cm$^2$, the roll might damage magnetic recording elements. When the treatment temperature is less than about 30° C., no substantial super calendering effect is exhibited. If the temperature is above about 200° C., changes in shape due to softening of the magnetic layer occur, which are not desired.

According to the present invention, since the mechanical strength as well, as the thermal expansion coefficient of the elastic roll, is much improved over the conventional calender roll, it is possible to have the advantages that the self-heating of the roll is minimized, and hence it is possible to operate the calender under a high nipping pressure.

Further, with the present calender roll, it is possible to increase the rotation speed of the calender. The magnetic tape processed by this calender roll has an increased magnetic packing factor, a uniform surface flatness and increased mechanical properties due to the high nipping pressure. There is no color variation in the width direction of the calendered tape, and a good appearance is obtained. These result in a high quality magnetic tape. It is further possible to reduce the roll diameter resulting in a reduction of manufacturing cost for the roll.

The advantages will be clarified by the following examples.

EXAMPLE

A glass fiber cloth in the form of tire cord and having thickness of 1 to 2 mm is wound four or five times on a roll core of carbon steel having length of 1100 mm and diameter of 220 mm to form the fibrous layers. The core carrying the fibrous layers is molded in a mold with polyamide resin to form an elastic roll so that the outer diameter of the roll is 300 mm and so that the surface portion of the roll, having a thickness of 15 to 20 mm, does not include the fibrous layer.

Table 1 shows data of magnetic tapes obtained by the calender roll prepared as above, together with data obtained by using a roll made of nylon molded on the core.

In these tests, the calendering work was performed under initial conditions of 45 kg/cm nipping pressure and 600 mm of roll length.

Table 1

|  | nylon roll | nylon + fiber roll |
| --- | --- | --- |
| roll temperature | 80 degree (partially 90° C.) | 60°–65° C. |
| calendar speed | 30–40 m/min. | 60–80 m/min. (maximum) |
| calendar nipping pressure (gange pressure) | 40–45 kg/cm$^2$ (max.) | 45–50 kg/cm$^2$ (max.) |

Table 1-continued

| | nylon roll | nylon + fiber roll |
|---|---|---|
| roll hardness (Shore) | 80° | 80° |
| tape performance (envelope variation) | none | none |
| tape deformation | irregular surface when taken up on a reel | substantially none |
| tape appearance | partial color variation | no color variation |

In order to investigate relations between the hardness of the outer portion of the elastic roll according to the present invention, and the tape processed by the roll and the durability of the roll itself, the video sensitivities of the magnetic tapes calendered by the present roll under conditions of a constant calender temperature, a constant roll pressure and a constant calender speed, with various roll hardnesses, were measured, and the rolls used in these test were observed.

The results of the measurements and the roll conditions are shown in Tables 2 and 3, respectively.

Table 2
Relation between the hardness of the calendar roll and the vedeo sensitivity

| roll hardness (degree in Shore) | set temperature (°C.) | pressure (kg/m) | speed (m/min.) | video sensitivity difference (dB) at 5 MHz |
|---|---|---|---|---|
| 60 | 60 | 200 | 60 | −0.5 (0.5) |
| 70 | 60 | 200 | 60 | 1.5 (0.5) |
| 80 | 60 | 200 | 60 | 2.8 (0.6) |
| 85 | 60 | 200 | 60 | 2.9 (0.6) |

In preparation for the video sensitivity measurment of the tape, the tape was slitted to ¾" (19 mm) width after the calender processing. The slitted tapes were incorporated in a U matic(registered tradename) video cassette of Sony Co. successively and a video signal of 5 MHz was recorded on the tapes by using a video cassette recorder (CR-6000 B) of Victor Company of Japan Ltd.

Table 3
the calendar roll condition with various roll hardness

| roll hardness | roll condition after two hours use |
|---|---|
| 60 | unusable due to considerable heat generation and thermal deformation of the roll |
| 70 | deformed due to a considerable heat generation around the center portion of the roll |
| 80 | stable surface condition. the surface temperature, 60°-65° C., slightly higher than the set temperature |
| 90 | stable surface condition. the surface temperature, 60°-62° C., slightly higher than the set temperature |

As will be clearly seen in Tables 2 and 3, the hardness of the surface portion of the present calender roll should be at least 80° in Shore. Further, when the surface hardness is lower than 80°, the calendered magnetic tape does not exhibit a practically acceptable video sensitivity, and the roll itself may be deformed or broken when used for a prolonged period of time, making the calendering operation impossible. Plastic materials suitable to provide the desired surface hardness may include, in addition to polyamide resin, mentioned previously, polyurethane, synthetic hard rubber etc.

Fibrous materials having better heat resistivity than the above plastic and usable for the present calender roll may be rayon fiber, glass fiber, carbon fiber, and steel fine cord etc. Any of these fiber material may be used in the form of canvas, cloth, thread or cotton and wound on the roll core as layers. Although the roll core having the five layers is described as being molded with the resin to form the roll, it may be possible to prepare the molded fiber layer and then to shrink-fit or press-fit it onto the roll core.

With the calender roll according to the present invention, the calendering of a magnetic tape under a high nipping pressure becomes possible, resulting in an improvement of the packing factor of the magnetic layer of the magnetic tape. Also, according to the present calender roll, a high speed calendering is possible which contributes to the tape manufacturing efficiency.

Further, the magnetic tape during the calendering operation by the present roll is less deformed and therefore, the permanent deformation of the tape base is negligible, which facilitates the take up of the tape. Since the temperature increase of the calender roll and the temperature distribution of the roll in the width directed thereof are very little, and uniform, respectively, a continuous calender operation is possible and the tape obtained thereby is high quality with no color variation.

What is claimed is:

1. In a super-calender roll for super-calendering the magnetic surface of a magnetic recording medium and having a core and a roll portion secured to said core, the improvement wherein:
    said roll portion comprises an inner roll portion of fibrous material on which is molded an outer roll portion of polyamide resin, the outer surface of said outer roll portion having a super smooth surface and being free of said fibrous material;
    said inner roll portion comprising a plurality of layers of said fibrous material wound on said core, the thickness of said plurality of layers being 20 to 30 mm;
    said outer roll portion has a thickness of about 10 to 15 mm, and said polyamide resin has a linear expansion co-efficient from about $8 \times 10^{-5}$/°C. to about $8 \times 10^{-4}$/°C.;
    said fibrous material is made of glass fibers; and
    the hardness of said outer surface is at least 80 degrees Shore.

2. The improvement claimed in claim 1, wherein said glass fibers are in the form of canvas.

3. The improvement claimed in claim 1, wherein said glass fibers are in the form of cloth.

4. The improvement claimed in claim 1, wherein said glass fibers are in the form of thread.

5. The improvement claimed in claim 1, wherein said glass fibers are in the form of cotton like material.

6. In a super-calender roll for super-calendering the magnetic surface of a magnetic recording medium and having a core and a roll portion secured to said core, the improvement wherein:
    said roll portion comprises an inner roll portion of fibrous material on which is molded on an outer roll portion of polyamide resin, the outer surface of said outer roll portion having a super smooth surface and being free of said fibrous material;
    said inner roll portion comprising a plurality of layers of said fibrous material wound said core, the thickness of said plurality of layers being 20 to 30 mm;

said outer roll portion has a thickness of about 10 to 15 mm, and said polyamide resin has a linear expansion co-efficient from about $8 \times 10^{-5}/°C$. to about $8 \times 10^{-4}/°C$.;

said fibrous material is made of carbon fibers; and the hardness of said outer surface is at least 80 degrees Shore.

7. In a super-calender roll for super-calendering the magnetic surface of a magnetic recording medium and having a core and a roll portion secured to said core, the improvement wherein:

said roll portion comprises an inner roll portion of fibrous material on which is molded an outer roll portion of polyamide resin, the outer surface of said outer roll portion having a super smooth surface and being free of said fibrous material;

said inner roll portion comprising a plurality of layers of said fibrous material wound on said core, the thickness of said plurality of layers being 20 to 30 mm;

said outer roll portion has a thickness of about 10 to 15 mm, and said polyamide resin has a linear expansion co-efficient from about $8 \times 10^{-5}/°C$. to about $8 \times 10^{-4}/°C$.;

said fibrous material is made of fine steel cords; and the hardness of said outer surface is at least 80 degrees Shore.

8. The improvement claimed in claims 1, 2, 6, 7, 3, 4 or 5, wherein said polyamide resin has a molecular weight of from about 10,000 to about 1,000,000 and a polymerization degree of about 150 to about 3,000.

* * * * *